United States Patent
Katikaneni et al.

(10) Patent No.: US 7,381,488 B2
(45) Date of Patent: Jun. 3, 2008

(54) REGENERATIVE OXIDIZER ASSEMBLY FOR USE IN PEM FUEL CELL APPLICATIONS

(75) Inventors: Sai P. Katikaneni, Danbury, CT (US); Pinakin Patel, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 634 days.

(21) Appl. No.: 10/916,202

(22) Filed: Aug. 11, 2004

(65) Prior Publication Data

US 2006/0035119 A1   Feb. 16, 2006

(51) Int. Cl.
    *H01M 8/18* (2006.01)
(52) U.S. Cl. .............. 429/19; 429/30; 429/34
(58) Field of Classification Search ........... 429/34, 429/30, 19; 422/209; 502/34
    See application file for complete search history.

(56) References Cited

U.S. PATENT DOCUMENTS

| | | | |
|---|---|---|---|
| 5,597,944 A | 1/1997 | O'Young et al. | |
| 5,635,155 A | 6/1997 | O'Young et al. | |
| 5,695,618 A | 12/1997 | O'Young et al. | |
| 5,702,674 A | 12/1997 | O'Young et al. | |
| 2004/0053088 A1* | 3/2004 | Haga | 429/20 |
| 2006/0191202 A1* | 8/2006 | Okamoto | 48/197 R |

OTHER PUBLICATIONS

U.S. Appl. No. 10/894,993, filed Jul. 20, 2004, Katikanani et al.
Steven L. Suib, Sorption, catalysis and separation by design, Chemical Innovation, Mar. 2000, vol. 30, No. 3, pp. 27-33.
Humidicore—p. 1 About Humidicore—.

* cited by examiner

*Primary Examiner*—Raymond Alejandro
(74) *Attorney, Agent, or Firm*—Cowan, Liebowitz & Latman, P.C.

(57) ABSTRACT

An oxidizer assembly provided with a housing having a plurality of inlets each for receiving a different gas and a plurality of outlets each corresponding to a different one of the inlets and outputting gas resulting from the gas received from its corresponding inlet. A catalyst assembly able to support gas flow therethrough is disposed within the housing and includes a catalyst able to oxidize carbon monoxide gas and to be regenerated. The catalyst assembly is further adapted to be movable such that successive parts of the assembly are able to be brought repeatedly in communication with a first inlet and its corresponding first outlet and then a second inlet and its corresponding second outlet of the housing. In the preferred form of the invention, the catalyst assembly is additionally adapted so that each section is brought in communication with a third inlet and its corresponding third outlet after being in communication with the second inlet and its corresponding second outlet and prior to being brought back into communication with the first inlet and its corresponding outlet.

17 Claims, 6 Drawing Sheets

REGENERATIVE OXIDIZER ASSEMBLY FOR USE IN PEM FUEL CELL APPLICATIONS

BACKGROUND OF THE INVENTION

This invention relates to oxidizer assemblies and, in particular, to oxidizer assemblies for use in proton exchange membrane ("PEM") fuel cell applications.

In copending application U.S. Ser. No. 10/894,993, filed Jul. 20, 2004, entitled OMS-2 Catalysts in PEM Fuel Cell Applications, there is disclosed an oxidizer assembly which utilizes an OMS ("octahedral molecular sieve")-2 catalyst to oxidize the carbon monoxide in the fuel feed to a PEM fuel cell. As described therein, OMS-containing materials, such as synthetic todorokite ($Mg^{2+}_{0.98-1.35}Mn^{3+}_{1.89-1.94}Mn^{4+}_{4.38-4.54}O_{12}4.47\text{-}4.55H_2O$) or cryptomelane (K-hollandite, $KMn_8O_{16}nH_2O$), comprise manganese oxide octahedral compounds linked by edges and vertices and forming uniform tunnels therethrough. OMS-2 catalysts are manganese oxide octahedral molecular sieves possessing the 2×2 tunnel structure (as in the aforementioned cryptomelane).

The '993 application specifically describes transition metal cation doped OMS-2 catalysts which can be framework-substituted and tunnel-substituted molecular sieves which are referred to by the designations [M]-OMS-2 and [M-OMS-2], respectively, where M indicates tunnel or framework-substituted metal cation(s) other than manganese. Specifically disclosed in the application as preferable catalysts are Co-OMS-2, Cu-OMS-2 and Ag-OMS-2, with Ag-OMS-2 being most preferable.

The '993 application also describes the operation of the OMS-2 catalyst to cause selective oxidation of the carbon monoxide in the feed to a PEM fuel-cell as occurring chemically via a sorption-chemical oxidation process aided by the unique pore structure and active sites of the catalyst. In particular, the sorption-chemical oxidation process at low temperatures is described as a two stage process, a sorption stage and a chemical oxidation stage. As stated therein, during the sorption stage, carbon monoxide is selectively adsorbed on the metal active side of the M-OMS-2 (Ag-OMS-2) catalyst as follows:

$$Ag^* + CO \rightarrow CO_{ad} \quad (1)$$

This process then proceeds to the chemical oxidation stage in which carbon monoxide is chemically oxidized with oxygen typically present in the OMS-2 tunnel or provided with the fuel feed or reformate gas. Specifically, oxygen from the OMS-2 tunnel is released in the following reaction:

$$O\text{-}OMS\text{-}2 \rightarrow OMS\text{-}2 + \tfrac{1}{2}O_2 \quad (2)$$

Subsequently, carbon monoxide is oxidized by reacting carbon monoxide with the released oxygen to produce carbon dioxide in the following reaction:

$$CO_{ad} + \tfrac{1}{2}O_2 \rightarrow CO_2 + Ag^* \quad (3)$$

Following the sorption-chemical oxidation reaction, the OMS-2 can be regenerated in situ by adding oxygen from a feed gas to produce an O-OMS-2 regenerative substrate. This reaction is as follows:

$$OMS\text{-}2 + \tfrac{1}{2}O_2 \rightarrow O\text{-}OMS\text{-}2 \quad (4)$$

The oxidizer assembly incorporating the OMS-2 catalyst is described in the '993 application as being capable of performing the oxidation and the regeneration processes simultaneously. In particular, an oxidizer assembly is disclosed in which parallel packed bed reactors each having an M-OMS-2 catalysts are operated so that one reactor is performing carbon monoxide oxidation of the PEM fuel cell feed gas, while the other reactor is having its M-OMS-2 catalyst being regenerated. While this type of oxidizer assembly is usable, a more compact and simpler oxidizer assembly is desired.

It is therefore an object of the present invention to provide an oxidizer assembly for oxidizing the carbon monoxide in a feed gas which is simple and compact in configuration.

It is a further object of the present invention to provide an oxidizer assembly of the above-mentioned type which is also capable of allowing in situ catalyst regeneration without interrupting the oxidation of carbon monoxide.

SUMMARY OF THE INVENTION

In accordance with the principles of the present invention, the above and other objectives are realized in an oxidizer assembly provided with a housing having a plurality of inlets each for receiving a different gas and a plurality of outlets. Each of the outlets corresponds to a different one of the inlets and outputs gas resulting from the gas received from its corresponding inlet. A catalyst assembly able to support gas flow therethrough is disposed within the housing and includes a catalyst able to oxidize carbon monoxide gas and to be regenerated. The catalyst assembly is further adapted to be movable such that successive parts of the assembly are able to be brought repeatedly in communication with a first inlet and its corresponding first outlet and then a second inlet and its corresponding second outlet of the housing. In the preferred form of the invention, the catalyst assembly is additionally adapted so that each section is brought in communication with a third inlet and its corresponding outlet after being in communication with the second inlet and its corresponding second outlet and prior to being brought back into communication with the first inlet and its corresponding outlet.

In this way, by supplying a feed gas with carbon monoxide to be oxidized to the first inlet, an oxidant gas to the second inlet and a cooling gas to the third inlet, the following occurs with respect to each region of the catalyst assembly: when in communication with the first inlet, the region receives the feed gas and oxidizes the carbon monoxide in the feed gas as the feed gas passes therethrough to the first outlet; when in communication with the second inlet, the region receives the oxidant gas and as the oxidant gas passes therethrough to the second outlet the catalyst in the region is regenerated; and when in communication with the third inlet, the region receives the cooling gas and is cooled as the cooling gas passes to the third outlet. This process is then repeated as each region of the catalyst assembly is brought repeatedly in communication with the first, second and third inlets.

In the form of the invention to be disclosed herein, the catalyst assembly comprises a porous body coated with an OMS-2 catalyst. Also, in a first embodiment of the invention to be disclosed herein, the porous catalyst body is rotatable within the housing and has first and second ends along its axis of rotation which abut and seal against, but rotate relative to, first and second sealing members, respectively. The first and second sealing members, in turn, abut first and second end walls of the housing which have the inlets and the outlets, respectively. In this case, the sealing members define at least first, second and third inlet manifolds which communicate with the first, second and third inlets, respectively, and corresponding first, second and third outlet manifolds which communicate with the first, second and third outlets, respectively, and at any given time the regions of the rotatable catalyst body in line with the respective inlet manifolds and their corresponding outlet manifolds are sealed from one another. As the catalyst body rotates, these regions change so that all parts of the catalyst body are repeatedly moved to communicate with the first, second and third inlet manifolds and thus the first, second and third inlets.

In a second embodiment of the invention, the porous catalyst body is also rotatable within the housing and is configured to define regions sealed from each other and which at first and second ends along the axis of rotation of the catalyst body communicate with first and second end walls of the housing which have, respectively, the inlets and outlets of the housing. As the catalyst body rotates, the regions move so that they are brought repeatedly into communication with the first, second and third inlets, while remaining sealed from each other.

In the above embodiments, the rotatable catalyst body is in the form of a honeycomb ceramic corderite structure with through passages.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
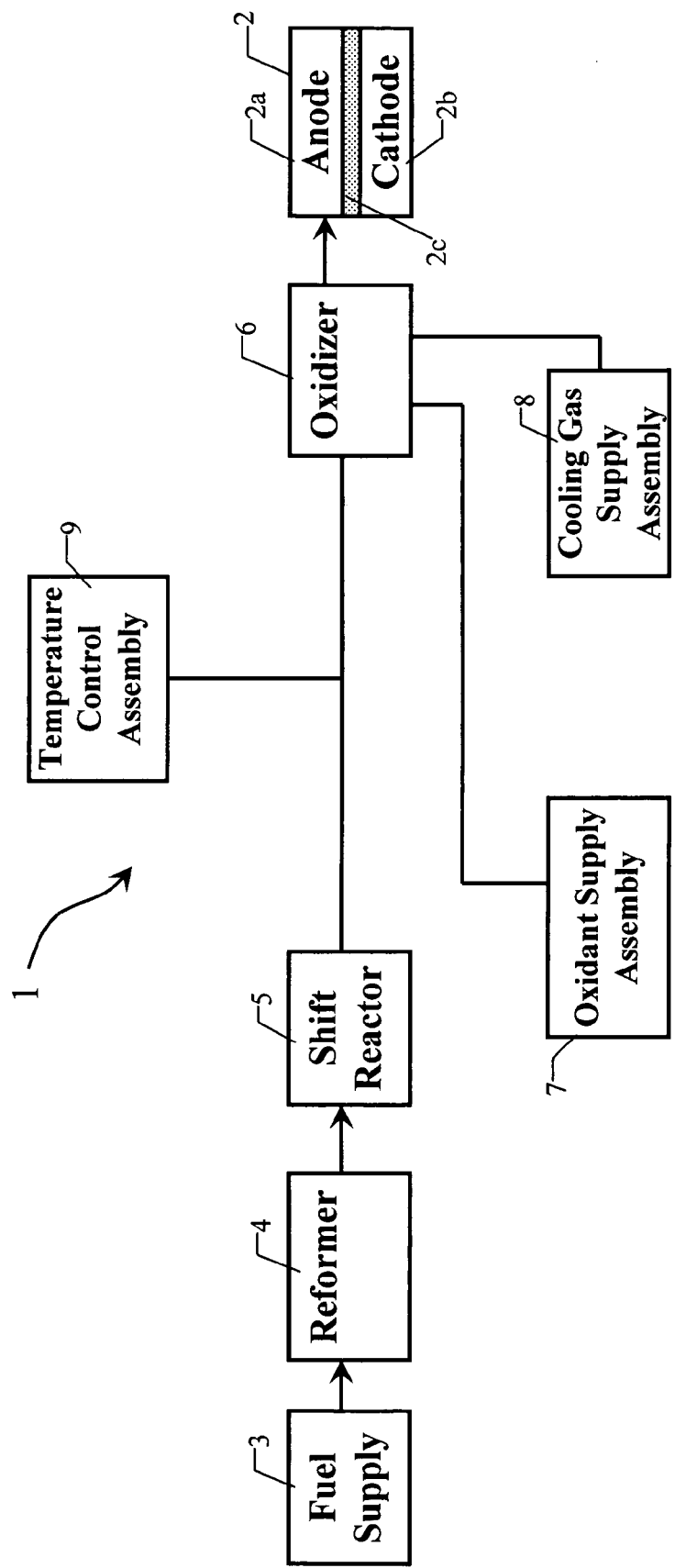
FIG. 1 shows a PEM fuel cell system using an oxidizer assembly for oxidizing carbon monoxide in accordance with the principles of the present invention.

FIG. 1 shows a PEM fuel cell system in accordance with the principles of the present invention. As shown, the system 1 comprises a PEM fuel cell 2 having an anode section 2a and a cathode section 2b separated by a PEM 2c. A fuel supply 3 provides a hydrocarbon fuel, such as, for example, natural gas, gasoline or methanol, to a reformer unit 4 which converts the hydrocarbon fuel to a PEM fuel feed or reformate which is rich in hydrogen. The fuel feed also contains substantial levels of carbon monoxide gas, typically greater than 20,000 ppm.

The PEM fuel cell feed from the reformer 4 is then passed through a low temperature shift reactor 5 in which a portion of the carbon monoxide gas is converted to carbon dioxide, thereby reducing its level, typically to about 2,000 ppm. An oxidizer 6 follows the shift reactor and is adapted to oxidize a further portion of the remaining carbon monoxide in the PEM fuel cell feed so that the level of carbon monoxide is less than about 20 ppm. The resultant PEM fuel cell feed is then delivered from the oxidizer to the anode section 2a of the PEM fuel cell 2, whereby the fuel undergoes electrochemical reaction with the oxidant supplied to the cathode section 2a of the fuel cell to thereby produce electrical energy.

As is also shown, an oxidant supply assembly 7 supplies oxidant to the oxidizer 6 for regenerating the catalyst of the oxidizer. A cooling gas supply assembly 8 further supplies a cooling gas to the oxidizer for cooling the oxidizer. These operations will be further described hereinbelow.

The oxidizer 6 is adapted to oxidize the carbon monoxide in the PEM fuel feed in such a manner as to readily handle transients in the level of carbon monoxide and with limited hydrogen consumption. This is realized, as discussed in the '993 application by using an OMS-2 catalyst as an oxidizing catalyst in the oxidizer 6. As previously discussed, OMS-2 catalysts are octahedral molecular sieves of, as, for example, cryptomelane (K-hollandite, $KMn_8O_{16}nH_2O$). The OMS-2 catalysts thus comprise manganese oxide octahedral compounds linked by edges and vertices and forming uniform tunnels therethrough. As also previously discussed, metal cations may be incorporated in the tunnels of the OMS compounds.

As stated in the '993 application, the preferable OMS-2 catalysts for the oxidizer 6 are metal cation doped OMS-2 catalysts, i.e., M-OMS-2 catalysts. Preferable M-OMS-2 catalysts are Co-OMS-2, Cu-OMS-2 and Ag-OMS-2, with Ag-OMS-2 being most preferable.

Figure 2:
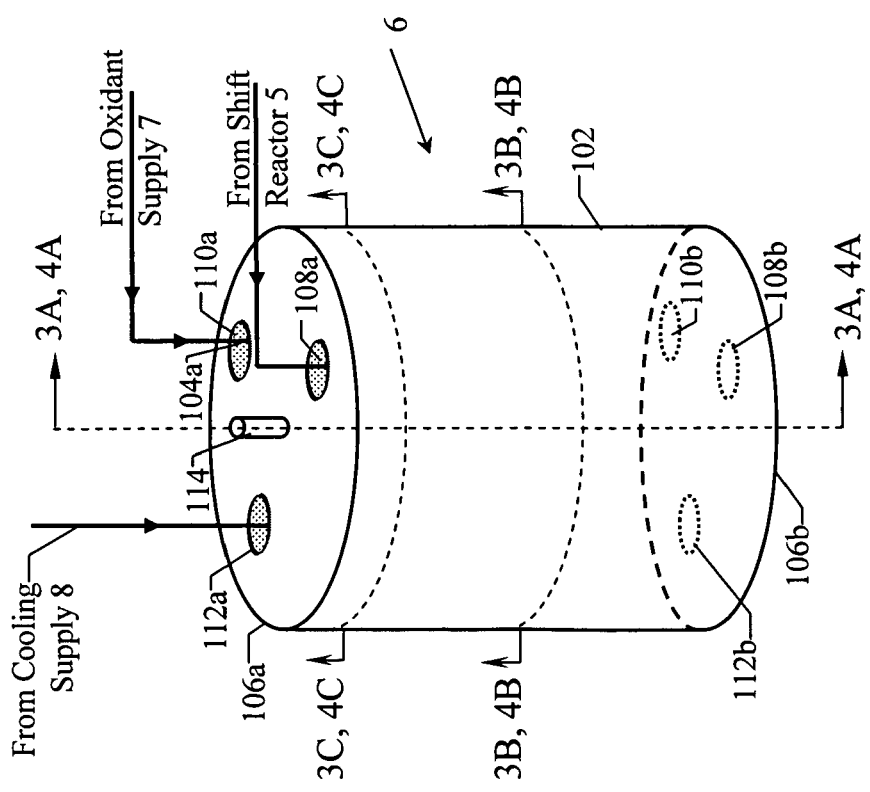
FIG. 2 shows the oxidizer assembly of FIG. 1 in greater detail.

FIG. 2 illustrates a form of the oxidizer assembly 6 in accordance with the principles of the present invention. As shown in FIG. 2, the oxidizer assembly 6 includes a catalyst assembly 104 having a catalyst body 104a which is enclosed within a housing 102. The housing 102, shown as cylindrical, has a first end wall 106a and a second end wall 106b. The first end wall 106a has a plurality of inlets 108a, 110a and 112a and the second end wall 106b a plurality of corresponding outlets 108b, 110b and 112b.

The inlets 108a, 110a and 112a are adapted to receive, respectively, the reformed fuel feed containing carbon monoxide from the shift reactor 5, the oxidant gas from the oxidant supply 7 for regeneration of the catalyst of the catalyst body 104a, and a cooling gas from the supply 8 for cooling the regions of the catalyst assembly which have had their catalyst regenerated. The outlets 108b, 110b and 112b, in turn, convey from the housing the gases received in the corresponding inlets 108a, 110a and 112a after the gasses have passed through the catalyst assembly 104.

As also shown, the oxidizer assembly 6 includes a drive shaft 114 for rotating the catalyst body 104a. This rotation brings each region of the catalyst body repeatedly into communication with the inlets 108a, 110a and 112a and their corresponding outlets 108b, 110b and 112b.

As can be appreciated, therefore, at any given time, the catalyst body 104a is simultaneously oxidizing carbon monoxide gas in the fuel feed in a first region of the body communicating with the inlet 108a and its corresponding outlet 108b, is having its catalyst regenerated by oxidant gas received in a second region of the body communicating with the inlet 110a and its corresponding outlet 110b, and is being cooled by a cooling gas in a third region of the body communicating with the inlet 112a and its corresponding outlet 112b. Moreover, as will be discussed in greater detail hereinbelow, the catalyst assembly 104 is further adapted such that the aforementioned first, second and third regions of the catalyst body are sealed from one another so that the gases delivered to and exiting from these regions do not mix with each other. Additionally, as the catalyst body rotates, the regions change so that all parts of the catalyst body come into communication with the first, second and third inlets and this process is continuously repeated.

Figure 3A:
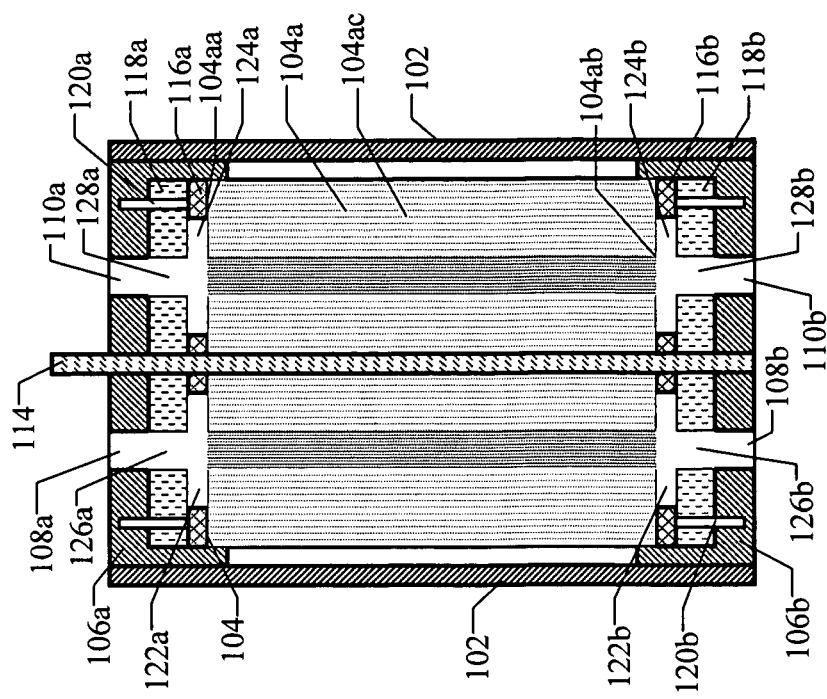
FIG. 3A shows a cross-sectional view taken along the line 3A-3A of FIG. 2 of a first embodiment of the oxidizer assembly of FIG. 2.
Figure 3C:
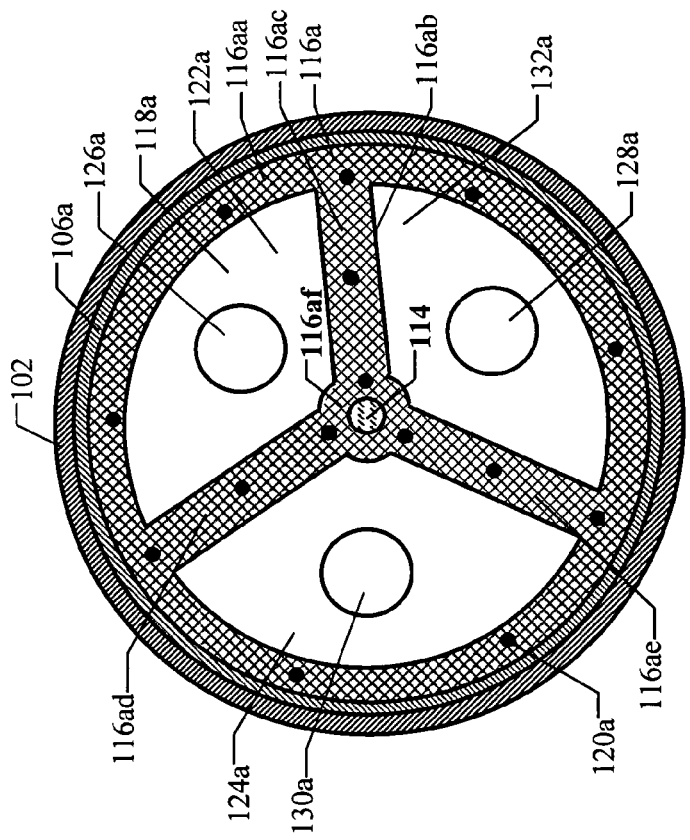
FIG. 3C shows a cross-sectional view taken along the line 3C-3C of FIG. 2 of the first embodiment of the oxidizer assembly of FIG. 2.
Figure 3B:
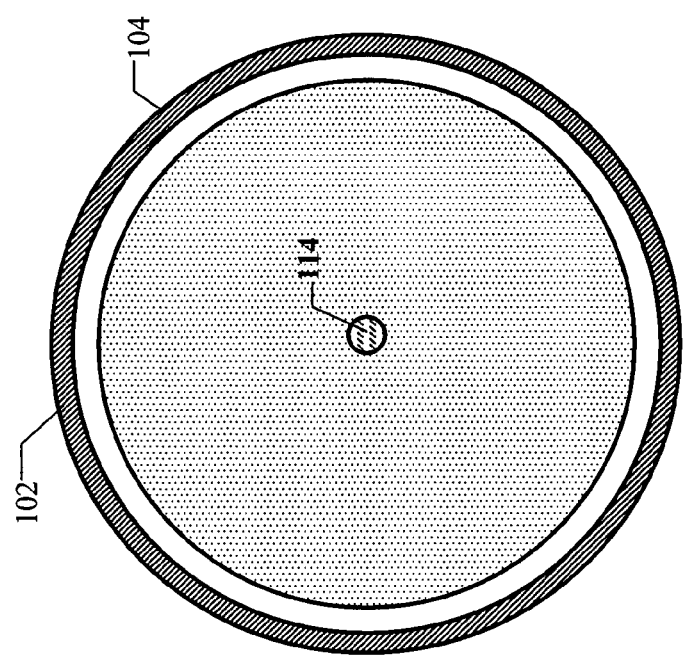
FIG. 3B shows a cross-sectional view taken along the line 3B-3B of FIG. 2 of the first embodiment of the oxidizer assembly of FIG. 2.

FIGS. 3A-3C illustrate detailed cross-sectional views of a first embodiment of the oxidizer assembly 6 of FIG. 2. These cross-sections are taken along the lines 3A-3A, 3B-3B and 3C-3C of FIG. 2. As shown in FIGS. 3A and 3B, the catalyst body 104a of the catalyst assembly is a one-piece substantially cylindrical porous structure with a circular cross-section. In the present case, the catalyst body is made porous via apertures 104ac extending therethrough between a first end 104aa and an opposing second end 104ab of the body. The catalyst body is also attached to the shaft 114 so as to be rotatable within the cylindrical housing 102. Typically, the housing 102 can be formed as a stainless steel canister and the catalyst body 104a as a ceramic honeycomb corderite monolith or structure having a catalyst coating, as described in more detail below.

The first and second end walls 106a and 106b of the housing 102 are formed as separate covers which fit into the respective open opposite ends of the housing 102 so as to close the housing and cover the catalyst body 104a and other components of the assembly 6 contained within the housing. In the particular case shown, each end wall 106a, 106b extends a short distance into the housing along the housing inner wall so as to fully cover the respective opening. Each end wall can typically be formed from a glass filled Teflon® material, although other high-temperature polymer materials, such as Viton® or PVA-based rubber, can also be used.

As is also shown, the drive shaft 114 passes through the length of oxidizer assembly 6 from the outer surface of the second end wall 106b to above the outer surface of the end wall 106a. The shaft is rotatably held and the catalyst body 104a is attached to the shaft so as to rotate therewith. Accordingly as the shaft is rotated by an actuator assembly (not shown) engaging the end of the shaft extending beyond the first end wall 106a, the catalyst body 104a also rotates within the housing 102.

In the present case, the catalyst assembly 104 further comprises a first sealing member 116a followed by a first gasket member 118a positioned between the first end 104aa of the catalyst body 104a and the first end wall 106a, and a second sealing member 116b followed by a second gasket member 118b positioned between the second end 104ab of the catalyst body 104a and the second end wall 106b. The sealing member 116a, the gasket member 118a and the end wall 106a are held together by a plurality of fastening members 120a. Like fastening members 120b hold the sealing member 116b, the gasket member 118b and the top plate 106b together. As can be appreciated, the combined unit of each end wall, gasket member and sealing member is fixed in place with respect to the container unit 102 and is not driven by the driving shaft 114.

Each gasket member 118a, 118b is disc shaped and includes three through openings aligned with the inlets or outlets in the adjacent end wall. In particular, as shown in FIG. 3C, the gasket member 118a includes through openings 126a, 128a and 130a aligned with the openings 108a, 110a, 112a in the first end wall 106a. The gasket member 118b similarly is disc shaped and includes three through openings 126b, 128b and 130b (not visible) aligned with the openings 108b, 110b and 112b in the second end wall 106b.

In the case shown, the inlets 108a, 110a and 112a are circular and of the same size. Likewise, the outlets 108b, 110b and 112b are circular and of the same size as each other and as the inlets. Additionally, each of the through openings 126a, 126b, 128a, 128b, 130a and 130b is circular and of the same size as the adjacent inlet or outlet. It should be noted, however, that the inlets, outlets and openings need not all be of the same size and shape and that these parameters can be varied depending upon the particular application and circumstances.

The sealing members 116a and 116b define first, second and third inlet manifolds and corresponding first, second and third outlet manifolds which are sealed from each other and which communicate with the respective through openings and inlets and outlets in the adjoining gasket members and end walls. At any given time, the three inlet manifolds and corresponding three outlet manifolds encompass three adjacent regions of the catalyst body 104a so that the gases passing into, through and out of each region are sealed form each other and do not mix.

As shown in FIG. 3C, the sealing member 116a defines three inlet manifolds 122a, 124a and 132a which are sealed from each other and align with the through openings 126a, 128a and 130a in the gasket 118a and the inlets 108a, 110a and 112a in the end wall 106a. The sealing member 116b is similar and defines three outlet manifolds 122b, 124b and 132b (not visible) which are sealed from each other and align with the through openings 126b, 128b and 130b in the gasket 118b and the outlets 108b, 110b and 112b in the end wall 106b.

In the illustrated case, the sealing member 116a comprises a circular outer part in the form of a ring 116aa which abuts the portion of the end wall 106a adjacent the inner wall of the housing 102. An inner part 116ab of the sealing member is Y-shaped and has three segments or arms 116ac, 116ad and 116ae which extend radially inward from the ring 116aa to a central hub part 116af through which the shaft 114 passes. As can be appreciated, the open regions between the arms 116ac-116ae define the inlet manifolds 122a, 124a and 132a. The sealing member 116b is similarly constructed thus defining the corresponding outlet manifolds 122b, 124b and 132b.

With this design for the sealing members, at any given time, three regions of maximum area of the catalyst body 104a are exposed, respectively, to the three inlets 108a, 110a ad 112a and their corresponding outlets 108b, 110b and 112b of the oxidizer assembly and these three regions are sealed from each other by the sealing members 116a and 116b. As a result, the catalyst body is simultaneously oxidizing the fuel feed from the shift reactor 5 in a first region in communication with the inlet manifold 122a, having its catalyst regenerated by the oxidant gas from the oxidant supply 7 in a second region in communication with the inlet manifold 124a, and being cooled by the cooling gas from the supply 8 in third region in communication with the inlet manifold 132a. Moreover, as the catalyst body is rotated, the areas of the catalyst body 104a forming the three sealed regions change so that all the areas of the body perform oxidation, are regenerated, and then are cooled in sequence and the process is then repeated.

A typical material for the gasket members 118a, 118b is Teflon®. The sealing members 116a,116b, in turn, can be formed from Viton®.

Figure 4B:
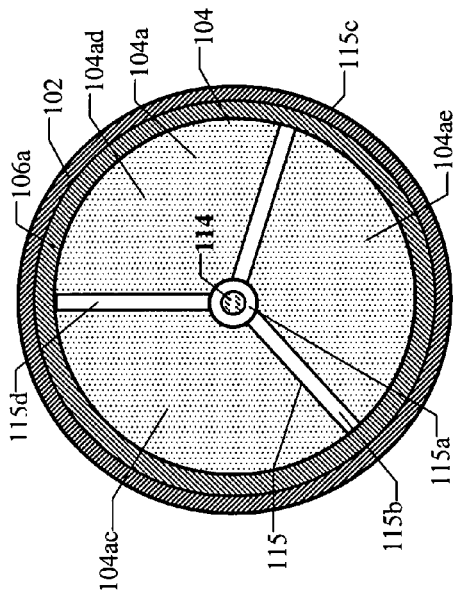
FIG. 4B shows a cross-sectional view taken along the line 4B-4B of FIG. 2 of the second embodiment of the oxidizer assembly of FIG. 2.
Figure 4C:
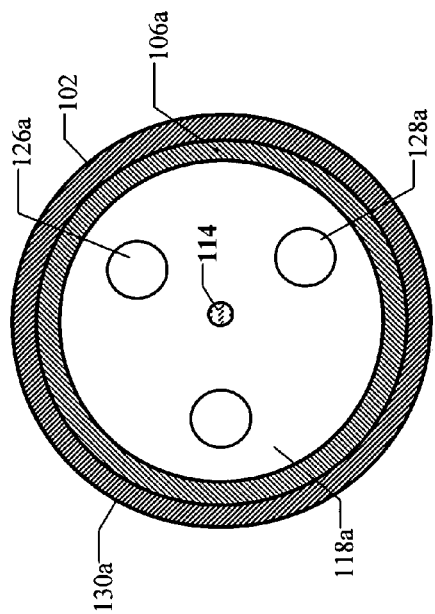
FIG. 4C shows a cross-sectional view taken along the line 4C-4C of FIG. 2 of the second embodiment of the oxidizer assembly of FIG. 2.
Figure 4A:
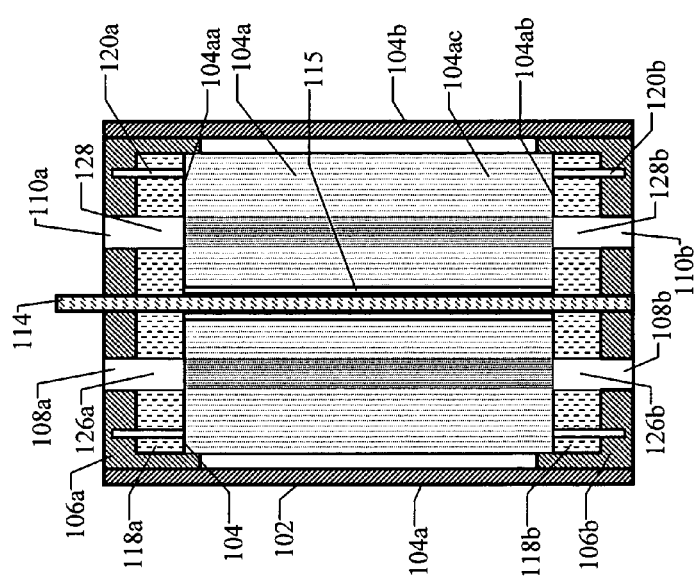
FIG. 4A shows a cross-sectional view taken along the line 4A-4A of FIG. 2 of a second embodiment of the oxidizer assembly of FIG. 2.

FIGS. 4A-4C illustrate detailed cross-sectional views of a second embodiment of the oxidizer assembly 6 of FIG. 2. These cross-sections are taken along the lines 4A-4A, 4B-4B and 4C-4C of FIG. 2. This embodiment uses a similar housing, end walls, gaskets and rotating shaft as in the embodiment of FIG. 3A-3C and these components have been similarly numbered. In this case, however, the sealing members 116a and 116b are not used and the sealing function is realized with catalyst body 104a itself.

More particularly, as can be seen the catalyst body is segmented into three separate regions 104ac, 104ad, and 104ae. These regions are carried by a Y-shaped sealing frame 115 which, typically, can be formed from, for example, Teflon® and/or Viton®. The frame 115 has a central hub 115a which is attached to the shaft 114 so that the frame and, therefore, the catalyst regions, can be rotated relative to the housing 102. Extending from the central hub are three arms 115b, 115c and 115d which extend radially outwardly from the hub to the end wall adjacent the inner wall of the housing 102. The arms 115b-115d additionally extend along the length of the housing from the gasket member 118a to the gasket member 118b, which as shown are thicker in this embodiment than in the embodiment of FIGS. 3A-3C. With this configuration for the arms, the catalyst regions 104ac-104ae are wedge shaped to fit the wedge shaped areas defined by the regions between successive arms.

The arms 115b-115d of the Y-shaped frame 115 in this embodiment act as seals to prevent gas being introduced into or exiting from the catalyst regions 104ac-104ae from mixing with each other. At any given time, therefore, each of the sealed regions 104ac-104ae is in communication with a different one of the inlets 108a, 110a, 112a and their corresponding outlets 108b, 110b and 112b of the oxidizer assembly. As a result, like the embodiment of the oxidizer assembly of FIGS. 3A-3C, the assembly of FIGS. 4A-4C is simultaneously oxidizing fuel feed from the reactor 5 in a first region in communication with the inlet 108a, is being regenerated by the oxidant gas from the supply 7 in a second region in communication with the inlet 110a, and is being cooled by the cooling gas from the cooling gas supply 8 in a third region in communication with the inlet 112a. Also, as the catalyst body 104a is rotated, the three regions are moved so that each communicates with the different inlet and outlet pairs sequentially. Continued rotation of the body 104a then repeats this process.

In the embodiment of the oxidizer assembly of FIGS. 4A-4C, the catalyst body is divided or segmented into three equal sections. However, the number as well as the dimensions of each section can be varied. Changing the number and/or dimensions of the catalyst body sections will of course require a corresponding change in the number and/or the angular spacing of the arms of the sealing member 115.

Figure 5:
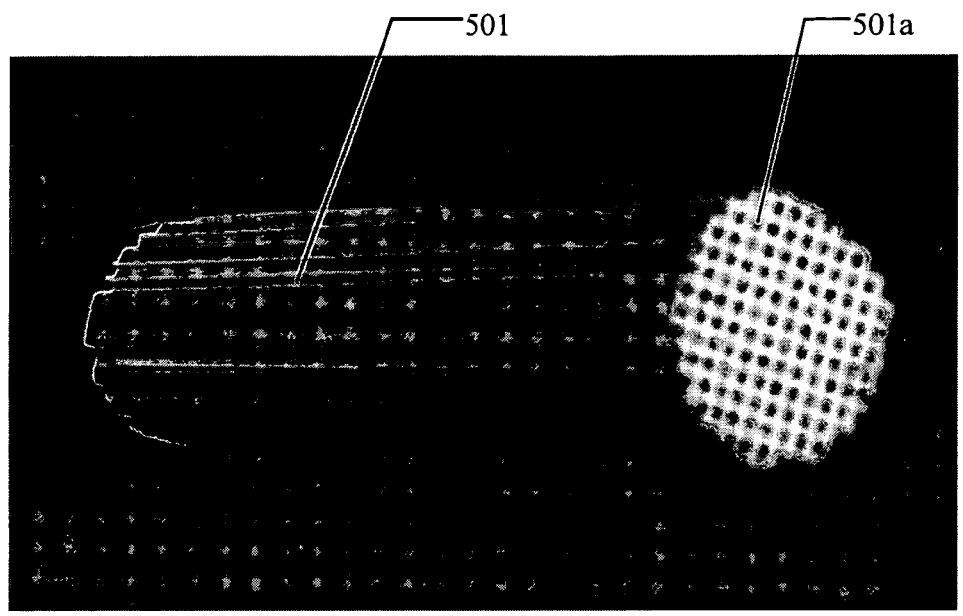
FIG. 5 shows a photograph of a ceramic honeycomb corderite substrate for use in the oxidizer assembly of FIG. 2.

As discussed above, the catalyst body 104a can be formed from a ceramic honeycomb corderite substrate coated with a catalyst, preferably an M-OMS-2 catalyst. FIG. 5. shows an example of a ceramic honeycomb monolith or substrate of corderite material manufactured by Emprise Corporation which is suitable for use as the body 104a. As can be seen in FIG. 5, the substrate 501 has a substantially cylindrical shape and a plurality of pores or cells 501a extending through the length of the substrate. The pores 501a form a plurality of channels through the length of the substrate 501 so as to allow gas or liquid to pass from one end to the other.

An example of a substrate 501a for use in the oxidizer of FIGS. 3A-3C, is a a substrate which is approximately 0.750 inches in diameter and 3 inches in length, and having a cross-section with approximately 300 to 500 pores or cells per square inch. The cylindrical substrate 501 may also be divided into several wedge-shaped segments and used in the embodiment of the oxidizer 6 in FIGS. 4A-4C.

As also mentioned above, the corderite substrate is coated with an M-OMS-2 catalyst to provide the desired catalyst body 104a. This may be accomplished by applying the M-OMS-2 catalyst to the ceramic honeycomb corderite substrate using a catalyst binder solution. A typical binder solution comprises the M-OMS-2 catalyst powder dispersed in a commercially available wetting agent, such as TFE Teflon®. A commercially available inking agent, such as Polyox™ WSR-301 manufactured by Union Carbide Corporation, may be added to increase the viscosity of the binder solution.

Prior to the application of the catalyst binder solution to the substrate, it is desirable to pre-wet the corderite material with deionized water to allow for better flow of the catalyst suspension through the corderite and to delay the absorption of liquid in the binder solution by the corderite. Additionally, pre-wetting the corderite substrate before applying the catalyst allows for larger amounts of catalyst to be held by the substrate than if the catalyst binder solution was applied to the substrate when dry. The binder solution is applied to the corderite substrate by a dipping method or a spraying method so as to coat the inner and outer surfaces of the corderite substrate.

Figure 6:
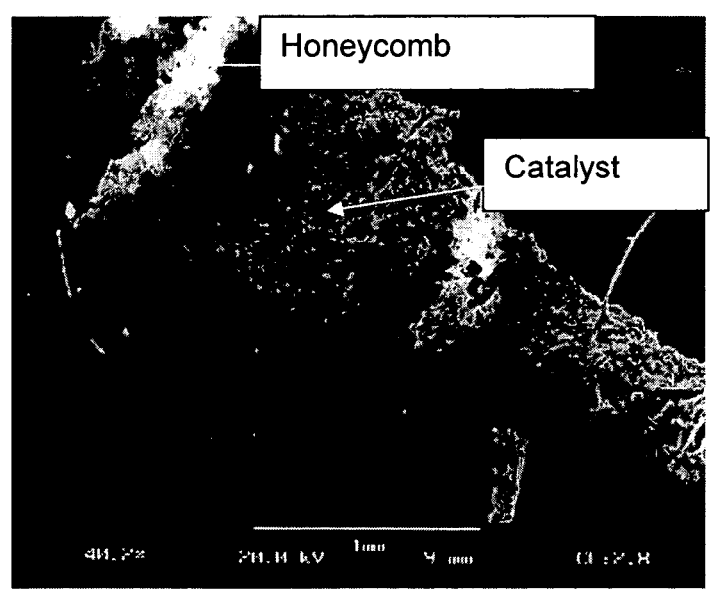
FIG. 6 shows an SEM photograph of an Ag-OMS-2 catalyst coated on the substrate of FIG. 5.

FIG. 6 shows an SEM photograph of an Ag-OMS-2 catalyst coated onto a honeycomb corderite substrate. As can be seen, the catalyst coating is uniformly distributed on the surface of the substrate.

Catalyst coated honeycomb corderite substrate samples for the catalyst body 104a have been prepared with approximately 0.44 to 0.51 grams of M-OMS-2 catalyst. In addition, it is further desirable that the resulting M-OMS-2 catalyst coating on the substrate comprise approximately 4% binder by weight, and that the capacity of the catalyst is approximately 0.125% by weight of carbon monoxide per gram of catalyst.

Figure 7:
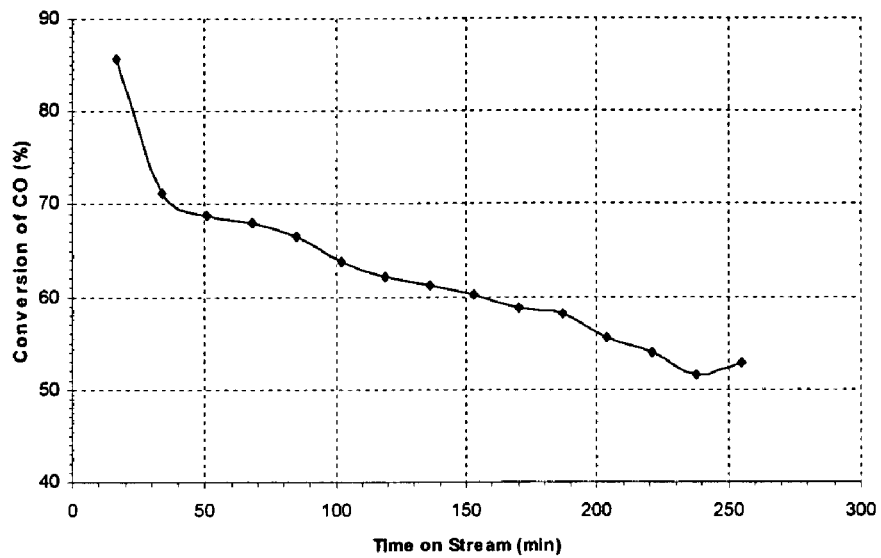
FIG. 7 shows a graph of performance data of coated substrate samples of FIG. 6 tested in a microreactor over a period of time.

Catalyst coated honeycomb corderite samples prepared as above set forth were tested in a micro-reactor bed. FIG. 7 shows a graph of performance data of the coated substrate samples tested using a simulated reformate fuel gas. The simulated reformate gas comprised 2235 ppm of carbon monoxide, 75% hydrogen, 25% carbon dioxide and 2000 ppm oxygen gas. During the testing, the simulated reformate gas was passed through the samples at 100° Celsius with a space velocity of 500 $h^{-1}$. As shown in FIG. 7, the samples tested were capable of converting approximately 85% of carbon monoxide to carbon dioxide, and after approximately 250 minutes of operation, the samples were converting over 50% of carbon monoxide in the simulated reformate.

After being exposed to the simulated reformate gas, these coated samples had their catalyst regenerated by passing through the samples a regeneration gas comprising oxygen at 150° Celsius for 30 minutes. After each regeneration cycle, approximately 85% carbon monoxide conversion was maintained, demonstrating that the catalyst of the coated substrate was able to be fully regenerated after being exposed to the regeneration gas.

Figure 8:
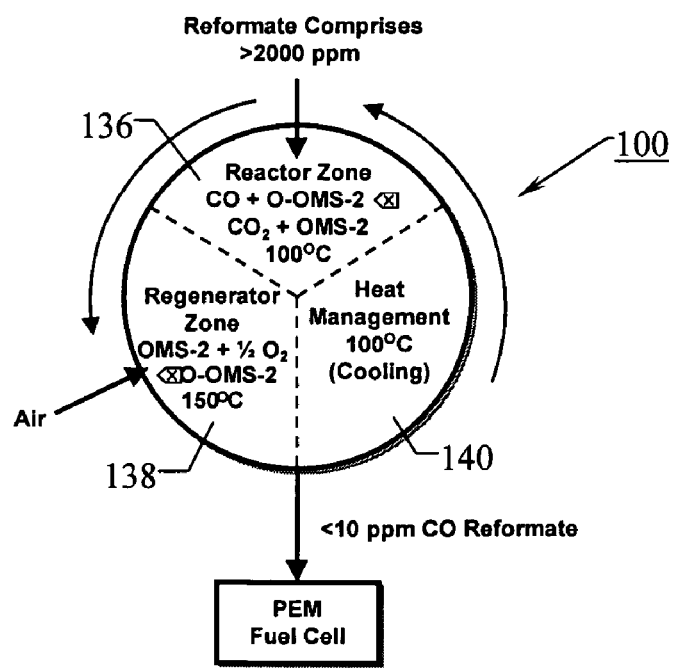
FIG. 8 shows a diagram of the operation of the oxidizer assembly of FIG. 2.

FIG. 8 illustrates schematically a typical operating sequence for the oxidizer assembly 6 of FIGS. 2, 3A-3C and 4A-4C where the catalyst used is an M-OMS-2 catalyst. As shown, the oxidizer assembly 6 is characterized as having a reactor zone 136 (defined by the inlet 108a of the assembly 6 and the corresponding outlet 108b of the assembly 6 and the region of the catalyst body 104a communicating therewith), a regenerator zone 138 (defined by the inlet 110a and the corresponding outlet 110b of the assembly 6 and the region of the catalyst body 104a communicating therewith) and a heat management or cooling zone 140 (defined by the inlet 112a and the corresponding outlet 112b of the assembly 6 and the region of the catalyst body 104a communicating therewith).

In operation, a reformate or fuel feed comprising more than 2000 ppm of carbon monoxide from the reactor 5 is passed through the reactor zone 136, where the carbon monoxide in the reformate gas is converted to carbon dioxide. Particularly, conversion of the carbon monoxide occurs via a sorption-chemical oxidation process which is carried out in two stages, a sorption stage and a chemical oxidation stage. During the sorption stage, carbon monoxide is selectively adsorbed on the metal active side of the M-OMS-2 catalyst as follows:

$$M^* + CO \rightarrow CO_{ad} \quad (5)$$

The chemical oxidation stage follows the sorption stage, and during this stage carbon monoxide is chemically oxidized with oxygen present in the OMS tunnels of the catalyst coating and/or provided in the reformate gas. Specifically, oxygen is released from the OMS tunnel and carbon monoxide is oxidized by reacting carbon monoxide with the released oxygen to produce carbon dioxide, as follows:

$$O\text{-}OMS\text{-}2 \rightarrow OMS\text{-}2 + \tfrac{1}{2}O_2 \quad (6)$$

$$CO_{ad} + \tfrac{1}{2}O_2 \rightarrow CO_2 + Ag^* \quad (7).$$

In the operation illustrated in FIG. 8, the above-described sorption-chemical oxidation reaction is carried out at 100° Celsius. Oxidized reformate gas leaving the reactor zone of the of the oxidizer assembly 6 comprises hydrogen rich gas with less than 10 ppm carbon monoxide and is suitable for use in the anode 2a of the PEM fuel cell 2.

As the region of the oxidizing assembly 6 oxidizes the carbon monoxide in the fuel feed, the catalyst in the region becomes exhausted or depleted. Rotation of the catalyst body 104a brings the region to the regenerator zone 138. In the regenerator zone, oxidant from the oxidant supply 7 is passed through the region, whereby the spent oxygen in the catalyst coating of that region is replaced. More particularly, oxygen supply in the M-OMS-2 tunnels of the catalyst coating is replenished through the following reaction:

$$OMS\text{-}2 + \tfrac{1}{2}O_2 \rightarrow O\text{-}OMS\text{-}2 \quad (8).$$

As shown, this regeneration process is carried out at 150-200° Celsius for approximately 15 to 30 minutes.

Before the regenerated region in the catalyst body 104a may be used again in the reactor zone 136, the temperature of the region has to be adjusted to correspond to the temperature of the zone. Accordingly, after undergoing regeneration in the regenerator zone 138, the rotation of the catalyst body 104a brings the regenerated region to the heat management zone 140.

In the heat management zone 140, the regenerated region of the catalyst body 104a is exposed to the cooling gas from the cooling gas supply 8 to reduce the temperature of the region to that of the reactor zone, i.e., to about 100° Celsius in the illustrated case of FIG. 8. In this case also, air at 100° Celsius may be used as the cooling gas. When the region is cooled to approximately 100° Celsius, it is ready to process additional reformate or fuel feed gas from the reactor 5 and continued rotation of the catalyst body 104a brings the cooled region back into the reaction zone 136.

As can be appreciated, the rotation of the catalyst body 104a can be continuous or intermittent depending upon the application. Also, in the case of the second embodiment shown in FIGS. 4A-4C, the sizing of the inlets and the outlets and the sizing of the sealed regions has to be such that at any given time each region communicates with only one inlet and its corresponding outlet. This prevents two gases from being supplied to a given region and a mixing of the gases.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A fuel cell system comprising:
    a PEM fuel-cell having an anode section and a cathode section and a PEM situated between said anode section and said cathode section; and
    an oxidizer assembly comprising: a housing having a plurality of inlets and a plurality of outlets, each of said outlets corresponding to a different one of said inlets; a catalyst assembly disposed within said housing and able support gas flow therethrough from each of said plurality of inlets, said catalyst assembly including a catalyst body having a catalyst for promoting oxidation of the carbon monoxide content of a first hydrogen containing gas and being able to be regenerated by a second gas, said catalyst body being adapted to be movable such that successive parts of said catalyst body are able to be brought repeatedly in communication with a first inlet of said plurality of inlets and the corresponding first outlet of said plurality of outlets and then a second inlet of said plurality of inlets and the corresponding second outlet of said plurality of outlets and, where said inlets are at least three and said corresponding outlets are at least three, then a third inlet of said plurality of inlets and the corresponding third outlet of said plurality of outlets;
    wherein: when said first gas is supplied to said first inlet of said plurality of inlets the part of said catalyst body in communication with said first inlet of said plurality of inlets and the corresponding first outlet of said plurality of outlets and through which said first gas passes causes said carbon monoxide component of said first gas to be oxidized and said first gas then passes through said corresponding first outlet of said plurality of outlets; and when said second gas is supplied to said second inlet of said plurality of inlets the part of said catalyst body in communication with said second inlet of said plurality of inlets and the corresponding second outlet of said plurality of outlets and through which aid second gas passes causes the catalyst in that part of said catalyst assembly to be regenerated and said second gas then passes through said corresponding second outlet of said plurality of outlets; and
    said first gas output from said first outlet of said plurality of outlets is supplied to said anode section of said PEM fuel cell.

2. A fuel cell system in accordance with claim 1, wherein when said housing has said third inlet and said corresponding third outlet and when a third cooling gas is supplied to said third inlet of said plurality of inlets the part of said catalyst body in communication with said third inlet of said plurality of inlets and the corresponding third outlet of said plurality of outlets and through which said third gas passes is cooled and said third gas then passes through said corresponding third outlet of said plurality of outlets.

3. A fuel cell system in accordance with claim 2, further comprising:
a first assembly adapted to provide said a first hydrogen containing gas having said carbon monoxide content;
a second assembly adapted to provide said second gas having oxidant content; and
a third assembly adapted to provide said third cooling gas.

4. A fuel cell system in accordance with claim 2, wherein: the temperature of said first gas is approximately 100° Celsius, the temperature of said second gas is approximately is between 150 and 200° Celsius and the temperature of said third gas is approximately 100° Celsius.

5. A fuel cell system in accordance with claim 2, wherein: said catalyst assembly includes a sealing assembly adapted to seal the parts of said catalyst body in communication with the first inlet of said plurality of inlets and the corresponding first outlet of said plurality of outlets, the second inlet of said plurality of inlets and the corresponding second outlet of said plurality of outlets, and the third inlet of said plurality of inlets and the corresponding third outlet of said plurality of outlets from each other, whereby the first, second and third gases passing into, through and out of said parts of said catalyst body are inhibited from mixing with each other.

6. A fuel cell system in accordance with claim 5, wherein said catalyst comprises M-OMS-2.

7. A fuel cell system in accordance with claim 6, wherein said M-OMS-2 catalyst is one of Cu—OMS-2, Co—OMS-2 and Ag—OMS-2.

8. A fuel cell system in accordance with claim 5, wherein said catalyst body is formed from ceramic corderite structure having pores and coated with said catalyst.

9. A fuel cell system in accordance with claim 5, wherein said catalyst body is rotatable in said housing.

10. A fuel cell system in accordance with claim 9, wherein: said catalyst body extends in length between first and second ends, is adapted to support gas flow therethrough between said first and second ends, is rotatable about an axis parallel to said length and is disposed such that said first and second ends of said catalyst body communicate, respectively, with said plurality of inlets of said housing and said plurality of outlets of said housing; and said housing is elongated between first and second end walls which face said first and second ends of said catalyst body, and said plurality of inlets are disposed in said first end wall of said housing and said plurality of outlets are disposed in the second end wall of said housing.

11. A fuel cell system in accordance with claim 10, wherein: said sealing assembly comprises: first and second sealing members, each sealing member having an outer ring part and a plurality of arms extending from spaced positions on the outer ring part inwardly to a central hub, said first sealing member abutting and sealing against the first end of said catalyst body as said catalyst body rotates so as to define sealed inlet manifolds corresponding to the open areas between adjacent arms of said first sealing member, each sealed inlet manifold being aligned with the a different one of the inlets in said first end wall of said housing, said second sealing member abutting and sealing against the second end of said catalyst body as said catalyst body rotates so as to define sealed outlet manifolds corresponding to the open areas between adjacent arms of said second sealing member, each sealed outlet manifold being aligned with the a different one of the outlets in said second end wall of said housing; and a first gasket situated between said first sealing member and said first end wall of said housing, said first gasket having a plurality of through openings equal in number to said plurality of inlets and each aligning with a different one of said plurality of inlets; and a second gasket situated between said second sealing member and said second end wall of said housing, said second gasket having a plurality of through openings equal in number to said plurality of outlets and each aligning with a different one of said plurality of outlets.

12. A fuel cell system in accordance with claim 11, wherein: said housing includes a cylindrical housing body having opposite open ends closed by said first and second end walls each of which includes a part which extends a distance along the inner surface of said cylindrical housing body; said catalyst body is substantially cylindrical and has through passages which extend between said first and second ends of said catalyst body; and said oxidizer assembly further comprises a shaft rotatably mounted in said housing, said shaft extending from the inner surface of said second end wall to beyond the outer surface of said first end wall and through said second gasket, the hub of said second sealing member, said catalyst body along the axis of rotation, the hub of said first sealing member and said first gasket; said shaft being attached to said catalyst body so that said catalyst body rotates with the rotation of said shaft.

13. A fuel cell system in accordance with claim 12, wherein said catalyst comprises M-OMS-2 and said catalyst body is formed from a ceramic corderite substrate having pores and coated with said catalyst.

14. A fuel cell system in accordance with claim 10, wherein: said sealing assembly comprises a sealing member having an elongated central part extending along the axis of said of said catalyst body to said first and second ends of said catalyst body and a plurality of arms extending outwardly from and along the length of said elongated central part, said catalyst body being segmented into catalyst body segments each held between adjacent arms of said sealing member and being sealed from one another by said arms and elongated central part of said sealing member, said sealing member being rotatable about said axis so as to rotate said catalyst body segments about said axis.

15. A fuel cell system in accordance with claim 14, said sealing assembly further comprises a first gasket situated between said first end of said catalyst body and said first end wall of said housing, said first gasket having a plurality of through openings equal in number to said plurality of inlets and each aligning with a different one of said plurality of inlets; and a second gasket situated between said second end of said catalyst body and said second end wall of said housing, said second gasket having a plurality of through openings equal in number to said plurality of outlets and each aligning with a different one of said plurality of outlets; and said housing includes a cylindrical housing body having opposite open ends closed by said first and second end walls each of which includes a part which extends a distance along the inner surface of said cylindrical housing body; said catalyst body segments are wedge shaped and have through passages which extend between said first and second ends of said catalyst body.

16. A fuel cell system in accordance with claim 15, wherein: said oxidizer assembly further comprises: a shaft rotatably mounted in said housing, said shaft extending from the inner surface of said second end wall to beyond the outer surface of said first end wall and through said second gasket, the elongated central part of said sealing member along the axis of rotation, and the first gasket; said shaft being attached to said elongated central part of said sealing member so that sealing member and said catalyst body segments rotate with the rotation of said shaft.

17. A fuel-cell system in accordance with claim 16, said catalyst comprises M-OMS-2 and said catalyst body is formed from ceramic corderite structure having pores and coated with said catalyst.

* * * * *